United States Patent
Matsuoka et al.

(10) Patent No.: US 10,838,227 B2
(45) Date of Patent: Nov. 17, 2020

(54) VEHICLE-MOUNTED DEVICE AND VEHICLE SYSTEM

(71) Applicant: Toyota Jidosha Kabushiki Kaisha, Toyota-shi, Aichi-ken (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/229,558

(22) Filed: Dec. 21, 2018

(65) Prior Publication Data

US 2019/0196212 A1 Jun. 27, 2019

(30) Foreign Application Priority Data

Dec. 26, 2017 (JP) .................. 2017-250045

(51) Int. Cl.
| | |
|---|---|
| *G03B 21/14* | (2006.01) |
| *G02B 30/56* | (2020.01) |
| *G09F 19/18* | (2006.01) |
| *B60R 11/00* | (2006.01) |
| *G09F 21/04* | (2006.01) |

(52) U.S. Cl.
CPC ............ *G02B 30/56* (2020.01); *B60R 11/00* (2013.01); *G03B 21/14* (2013.01); *G09F 19/18* (2013.01); *G09F 21/04* (2013.01); *B60R 2011/004* (2013.01)

(58) Field of Classification Search
CPC ............ G02B 27/22; G02B 27/2221; G02B 27/2235; G02B 27/2271; G02B 27/2285; G02B 27/2292; G03B 21/14; G03B 21/606; G03B 21/56
USPC .................................. 353/7, 10, 13
See application file for complete search history.

(56) References Cited

U.S. PATENT DOCUMENTS

| | | | | |
|---|---|---|---|---|
| 2,592,444 | A * | 4/1952 | Matelena | G09F 19/18 353/13 |
| 5,871,267 | A * | 2/1999 | Wende | G09F 19/16 353/122 |
| 7,341,351 | B2 * | 3/2008 | Halmi | G09F 19/18 353/122 |
| 7,357,515 | B2 * | 4/2008 | Dremlyuga | H04N 13/39 353/62 |
| 2005/0068999 | A1 | 3/2005 | Momiuchi et al. | |
| 2016/0357025 | A1 | 12/2016 | King | |

FOREIGN PATENT DOCUMENTS

| | | |
|---|---|---|
| CN | 106247247 A | 12/2016 |
| CN | 106291927 A | 1/2017 |
| JP | 2003233339 A | 8/2003 |
| JP | 2008265487 A | 11/2008 |

\* cited by examiner

*Primary Examiner* — William C. Dowling
(74) *Attorney, Agent, or Firm* — Dinsmore & Shohl LLP

(57) ABSTRACT

In a vehicle-mounted device configured to be mounted on a vehicle for providing a service, a projector projects, based on data of a three-dimensional image related to the service, the three-dimensional image in the air above the vehicle.

4 Claims, 3 Drawing Sheets

VEHICLE-MOUNTED DEVICE AND VEHICLE SYSTEM

CROSS-REFERENCE TO RELATED APPLICATIONS

This application claims priority to Japanese Patent Application Mo. 2017-250045 filed on Dec. 26, 2017, which is incorporated herein by reference in its entirety including the specification, drawings and abstract.

BACKGROUND

1. Technical Field

The present disclosure relates to a vehicle-mounted device mounted on a vehicle and to a vehicle system.

2. Description of Related Art

There have been known vehicles that can be transformed into street stalls (see JP-A-2008-265487, for example).

A situation can be considered in which a plurality of the vehicles disclosed in JP-A-2008-265487 are gathered together to provide different services respectively. In this case, it is difficult for a visitor to find a vehicle providing a desired service.

The present disclosure addresses the above-described issue, and a general purpose thereof is to provide a vehicle-mounted device and a vehicle system, that allow, when multiple vehicles providing multiple services are gathered together, a visitor to easily recognize a vehicle providing a desired service.

To resolve the issue above, a vehicle-mounted device of one embodiment is configured to be mounted on a vehicle for providing a service, and the vehicle-mounted device includes a projector configured to project, based on data of a three-dimensional image related to the service, the three-dimensional image in the air above the vehicle.

According to this embodiment, since a three-dimensional image related to the service provided by the vehicle is projected in the air above the vehicle, the three-dimensional image can be visually recognized easily from a position relatively distant from the vehicle, so that people therearound can be effectively informed of the service provided by the vehicle. Therefore, when multiple vehicles providing multiple services are gathered together, a visitor can easily recognize a vehicle providing a desired service.

Another embodiment relates to a vehicle system. The vehicle system includes a first vehicle-mounted device configured to be mounted on a first vehicle, and a second vehicle-mounted device configured to be mounted on a second vehicle. The first vehicle-mounted device includes a first projector configured to project, based on data of a first portion of a three-dimensional image, the first portion of the three-dimensional image in the air outside the first vehicle. The second vehicle-mounted device includes a second projector configured to project, based on data of a second portion of the three-dimensional image, the second portion of the three-dimensional image in the air outside the second vehicle.

According to this embodiment, with luminance similar to that of three-dimensional images projected by the respective projectors, a three-dimensional image larger in size than each of the three-dimensional images projected by the respective projectors can be projected. Accordingly, a larger and clearer three-dimensional image can be easily projected outdoors. Therefore, when multiple vehicles providing multiple services are gathered together, a visitor can easily recognize a vehicle providing a desired service.

Yet another embodiment also relates to a vehicle system. The vehicle system includes a first vehicle-mounted device configured: to be mounted on a first vehicle, and a second vehicle-mounted device configured to be mounted on a second vehicle. The first vehicle-mounted device includes a first projector configured to project, based on first data, a first three-dimensional image in the air outside the first vehicle. The second vehicle-mounted device includes a second projector configured to project, based on second data, a second three-dimensional image such that the second three-dimensional image overlaps with the first three-dimensional image.

According to this embodiment, a three-dimensional image of which the luminance is higher than that of each of the first and second three-dimensional images can be projected. Accordingly, a larger and clearer three-dimensional image can be easily projected outdoors. Therefore, when multiple vehicles providing multiple services are gathered together, a visitor can easily recognize a vehicle providing a desired service.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Embodiments will now be described. The embodiments are illustrative and are not intended to be limiting.

First Embodiment

Figure 1:
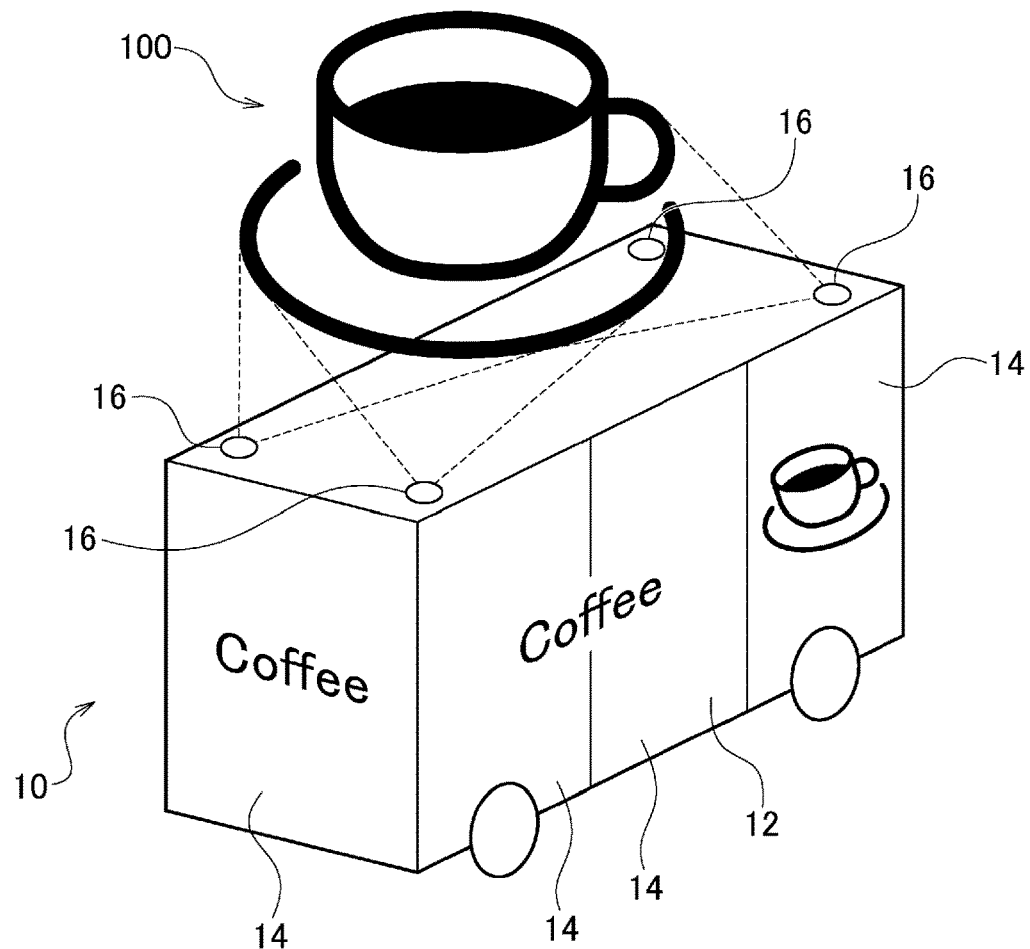
FIG. 1 is a perspective view that schematically shows a vehicle according to a first embodiment, and a three-dimensional image projected by the vehicle.

FIG. 1 is a perspective view that schematically shows a vehicle 10 according to the first embodiment, and a three-dimensional image 100 projected by the vehicle 10. The vehicle 10 provides a predetermined service. The service may be a food and drink service, a product sales service, a financial service, a medical service, an energy providing service, and an administrative service, for example, and is not particularly limited. Facilities mounted on the vehicle 10 are determined depending on the service to be provided. In the following, an example will be described in which the vehicle 10 provides a food and drink service, more specifically a drink service, and is configured as a coffee shop.

The vehicle 10 comprises a door 12, multiple display panels 14, and multiple projectors 16. The door 12 is provided, for example, on at least one side surface of the vehicle 10 and is slid to be opened or closed.

The display panel 14 is provided on each of the front surface, side surfaces, and rear surface of the vehicle 10. The display panel 14 is also provided on the door 12. The display panel 14 displays a two-dimensional image related to the service provided by the vehicle 10. In the example shown in FIG. 1, the display panels 14 display the characters of "Coffee" and an image of a coffee cup, related to the drink service.

The four projectors 16 are provided at the four corners of the top surface of the vehicle 10. The projectors 16 are projection devices that project a three-dimensional image 100 in the air above the vehicle 10, based on data of a three-dimensional image related to the service provided by the vehicle 10. In the example shown in FIG. 1, the projectors 16 project the three-dimensional image 100 of a coffee cup related to the drink service. The three-dimensional image 100 may include characters. The three-dimensional image 100 may be a stereoscopically displayed still image, or a stereoscopically displayed moving image. The number of projectors 16 is not particularly limited and may be one. The positions of the projectors 16 are also not particularly limited, as long as the three-dimensional image 100 can be projected at the positions.

For the projection of the three-dimensional image 100 by the projectors 16, a well-known technology can be employed. For example, the projectors 16 may focus infrared laser beams at predetermined positions in the air, so that gas present at each of the positions is locally placed in a plasma state to emit a flash. These positions are visually recognized as luminous points. When the projectors 16 three-dimensionally scan the positions at which infrared laser beams are focused, a visible image can be stereoscopically presented in the air. Alternatively, the three-dimensional image 100 may be projected in the air using a holography technology, or steam may be generated and the three-dimensional image 100 may be projected thereon.

Figure 2:
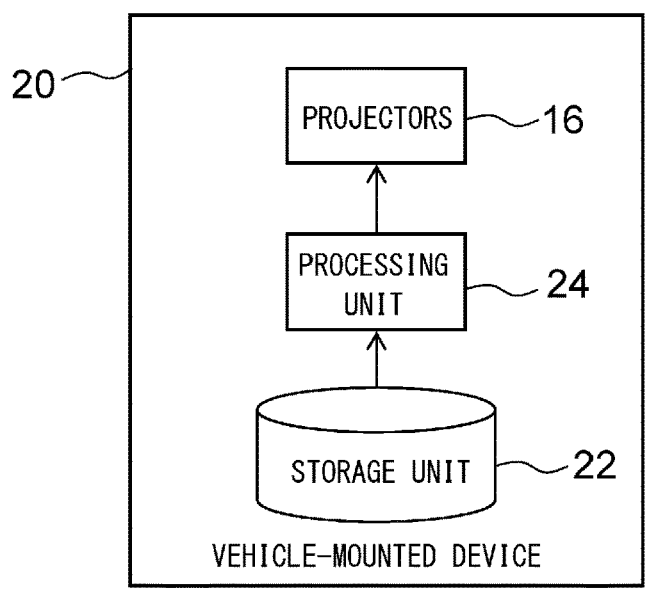
FIG. 2 is a block diagram of a vehicle-mounted device provided in the vehicle shown in FIG. 1.

The vehicle 10 comprises a vehicle-mounted device 20 including the projectors 16. FIG. 2 is a block diagram of the vehicle-mounted device 20 provided in the vehicle 10 shown in FIG. 1. The vehicle-mounted device 20 comprises a storage unit 22, a processing unit 24, and the projectors 16.

The storage unit 22 stores the data of the three-dimensional image 100 related to the service. The data can be updated or selected based on the service. The data of the three-dimensional image 100 include three-dimensional coordinates on which the respective luminous points of the three-dimensional image 100 are to be projected. The coordinates are based on the coordinate system set for the vehicle 10. The data of the three-dimensional image 100 may also include data of luminance and colors at the respective coordinates, for example.

The processing unit 24 reads the data of the three-dimensional image 100 stored in the storage unit 22 and provides the data thus read to the projectors 16. The processing unit 24 may perform: coordinate transformation processing, such as enlargement and reduction, on the read data. The projectors 16 project the three-dimensional image 100 based on the data provided from the processing unit 24.

The configuration of the processing unit 24 may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

There will now be described the overall operation of the vehicle 10 and the vehicle-mounted device 20 having the configurations set forth above. The vehicle 10 is stopped in an open space or the like to provide the drink service to visitors. More specifically, a person who was riding the vehicle 10 provides the drink service to visitors. The projectors 16 project the three-dimensional image 100 of a coffee cup above the vehicle 10. The three-dimensional image 100 is stereoscopically recognized.

Multiple vehicles 10 providing multiple services can be gathered together. Depending on the combination of the multiple services, the multiple vehicles 10 may be provided for a local festival, an event for development of an area, a tourist site, an event for brand user experience (UX), a company event, a sports festival, Japanese Bon festival dance, a shelter in a disaster area, and the likes. Also, depending on the combination of the multiple services, the multiple vehicles 10 can constitute an aggregation, of multiple medical facilities, a food mall, an aggregation of financial institutes, and the likes.

Thus, according to the present embodiment, since the three-dimensional image 100 related to the service is projected in the air above the vehicle 10 based on the data of the three-dimensional image 100, the three-dimensional image 100 can be visually recognized easily from a position relatively distant from the vehicle 10, so that people therearound can be effectively informed of the service provided by the vehicle 10.

Also, when multiple vehicles 10 providing multiple services are gathered together, the vehicles 10 cannot be easily distinguished from each other by shape as they have the same shape, but the vehicles 10 can be easily distinguished from each other by the three-dimensional image 100. Therefore, a visitor can easily recognize a vehicle providing a desired service.

Second Embodiment

In the second embodiment, multiple projectors 16 of multiple vehicles 10 project a three-dimensional image 100. In the following, description will be given mainly for the differences from the first embodiment.

Figure 3:
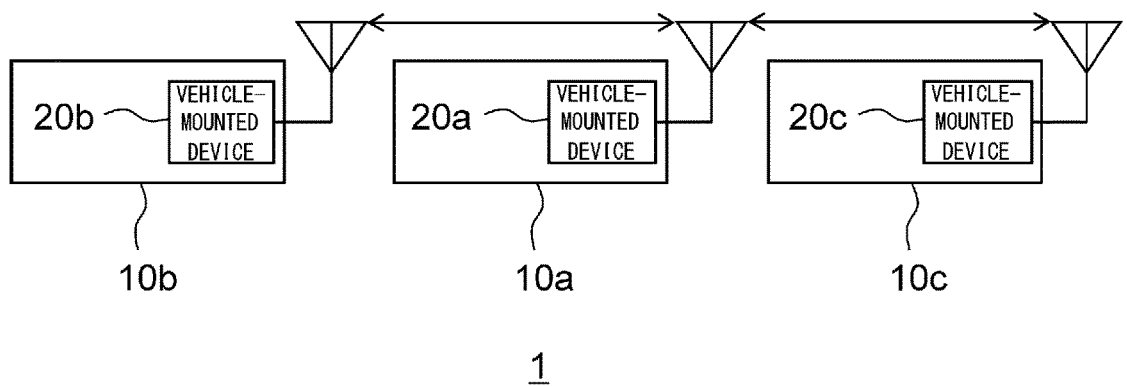
FIG. 3 is a block diagram of a vehicle system according to a second embodiment.

FIG. 3 is a block diagram of a vehicle system 1 according to the second embodiment. The vehicle system 1 comprises a first vehicle-mounted device 20a mounted on a first vehicle 10a, a second vehicle-mounted device 20b mounted on a second vehicle 10b, and a third vehicle-mounted device 20c mounted on a third vehicle 10c. The first vehicle 10a, second vehicle 10b, and third vehicle 10c may be collectively referred to as vehicles 10. Also, the first vehicle-mounted device 20a, second vehicle-mounted device 20b, and third vehicle-mounted device 20c may be collectively referred to as vehicle-mounted devices 20.

The vehicles 10 provide an image service. The number of vehicles 10, i.e., the number of vehicle-mounted devices 20, has only to be plural and may be appropriately determined based on the size of the three-dimensional image to be projected, for example.

Each vehicle-mounted device 20 performs wireless communication. The wireless communication standard is not particularly limited, and may be wireless LAN, 3G (third-generation mobile communication system), 4G (fourth-generation mobile communication system), or 5G (fifth-generation mobile communication system), for example.

Figure 4:
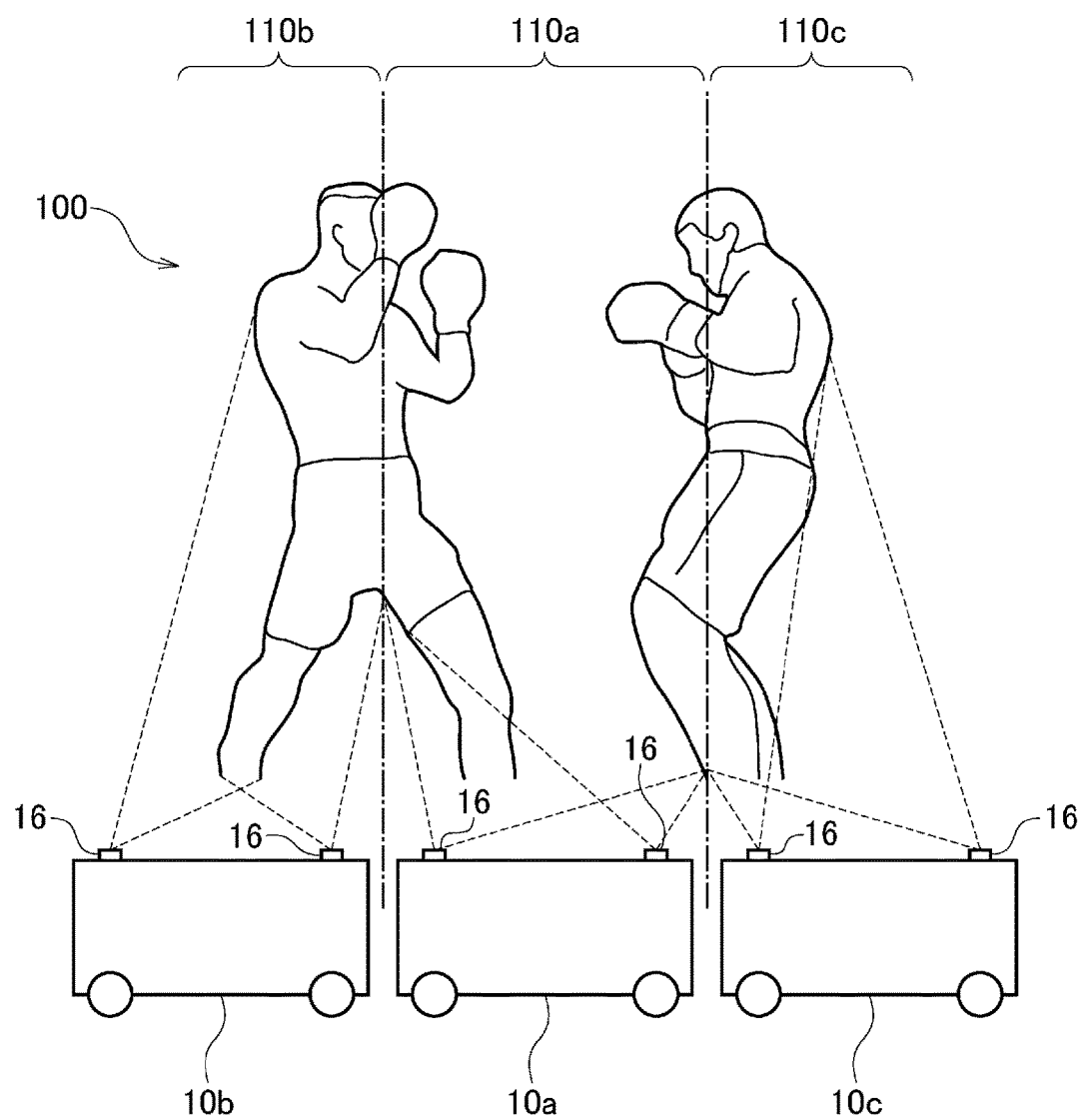
FIG. 4 is a side view that schematically shows an arrangement of the vehicles shown in FIG. 3 and a three-dimensional image projected by the vehicles.

FIG. 4 is a side view that schematically shows an arrangement of the vehicles 10 shown in FIG. 3 and the three-dimensional image 100 projected by the vehicles 10. The first vehicle 10a, second vehicle 10b, and third vehicle 10c are arranged in a line in which the first vehicle 10a is placed in the middle. The arrangement of the vehicles 10 and the order of the arranged vehicles 10 is not particularly limited. The first vehicle 10a, second vehicle 10b, and third vehicle 10c need not necessarily be arranged in a line.

The projectors (first projectors) 16 of the first vehicle 10a project a first portion 110a of the three-dimensional image 100 in the air. The projectors (second projectors) 16 of the second vehicle 10b project a second portion 110b of the three-dimensional image 100 in the air. The projectors (third projectors) 16 of the third vehicle 10c project a third portion 110c of the three-dimensional image 100 in the air.

The first portion 110a, second portion 110b, and third portion 110c constitute one three-dimensional image 100, Namely, the three-dimensional image 100 includes the first portion 110a in the middle, the second portion 110b on the second vehicle 10b side, and the third portion 110c on the third vehicle 10c side. The three-dimensional, image 100 is an image related to the image service provided by the vehicles 10.

Figure 5:
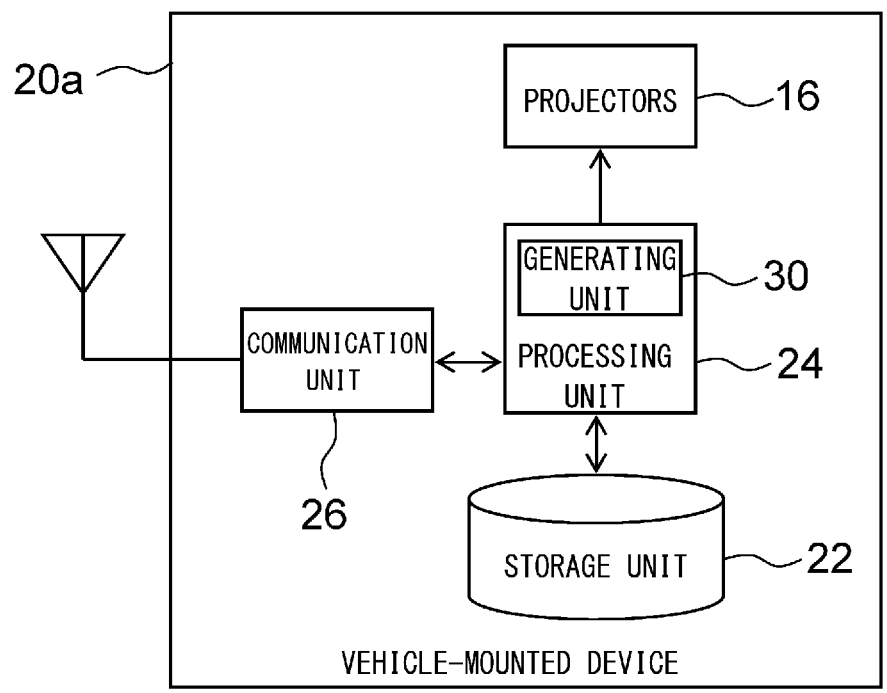
FIG. 5 is a block diagram of a first vehicle-mounted device shown in FIG. 3.

FIG. 5 is a block diagram of the first vehicle-mounted device 20a shown in FIG. 3. In addition to the configuration shown in FIG. 2, the first vehicle-mounted device 20a further comprises a communication unit 26. Also, the processing unit 24 includes a generating unit 30.

The communication unit 26 receives the data of the three-dimensional image 100 from a server device or the like, which is not illustrated, and outputs the data to the processing unit 24. The data of the three-dimensional image 100 may be image data of live sports coverage or data of television broadcasting and is not particularly limited. In the example of FIG. 4, the data of the three-dimensional image 100 is image data of boxing coverage. Namely, the three-dimensional image 100 is a stereoscopically displayed moving image. The three-dimensional image 100 may also be a stereoscopically displayed still image.

Based on the data of the three-dimensional image 100 output from the communication unit 26, the generating unit 30 generates data of the first portion 110a of the three-dimensional image 100, data of the second portion 110b of the three-dimensional image 100, and data of the third portion 110c of the three-dimensional image 100. As in the first embodiment, these data include three-dimensional coordinates on which the respective luminous points of the three-dimensional image 100 are to be projected. The coordinates may be based on the coordinate system set for the first vehicle 10a, for example. The storage unit 22 stores data, as appropriate.

The communication unit 26 transmits the data of the second portion 110b generated in the generating unit 80 to the second vehicle-mounted device 20b, and transmits the data of the third portion 110c generated in the generating unit 30 to the third vehicle-mounted device 20c.

Based on the data of the first portion 110a generated in the generating unit 30, the projectors 16 project the first portion 110a of the three-dimensional image 100 in the air outside the first vehicle 10a.

Figure 6:
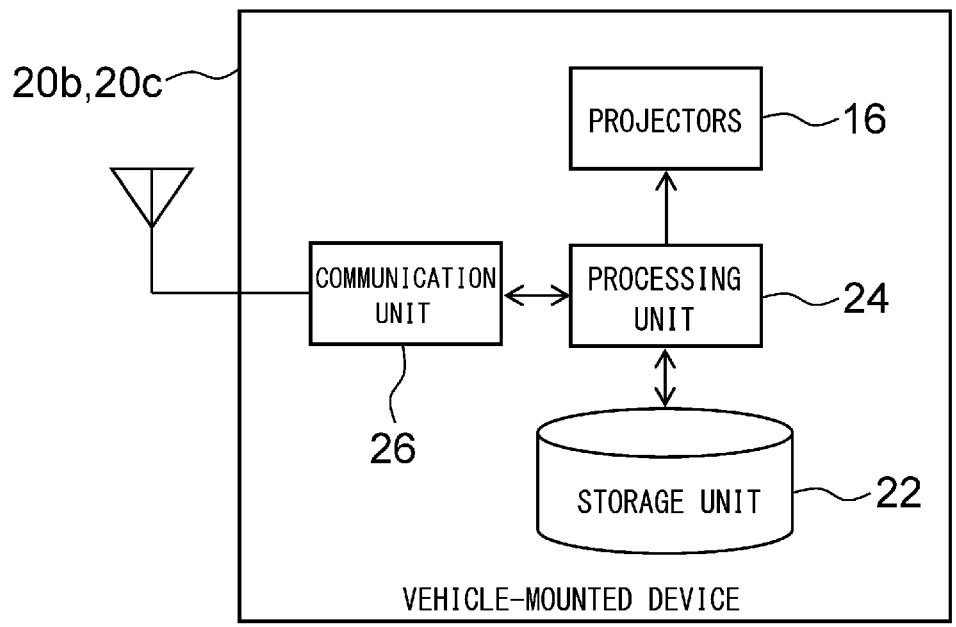
FIG. 6 is a block diagram of each of a second vehicle-mounted device and a third vehicle-mounted device shown in FIG. 3.

FIG. 6 is a block diagram of each of the second vehicle-mounted device 20b and the third vehicle-mounted device 20c shown in FIG. 3. Each of the second vehicle-mounted device 20b and the third vehicle-mounted device 20c differs from the first vehicle-mounted, device 20a in that the processing unit 24 does not include the generating unit 30.

The second vehicle-mounted device 20b will now be described. The communication unit 26 receives the data of the second portion 110b of the three-dimensional image 100 transmitted from the first vehicle-mounted device 20a and outputs the data thus received to the processing unit 24.

Based on information regarding the position and direction of the second vehicle 10b with respect to the first vehicle 10a, the processing unit 24 corrects the data of the second portion 110b received at the communication unit 26 such that each of corresponding luminous points of the three-dimensional image 100 is projected on coordinates included in the data of the second portion 110b. When the second vehicle 10b is stopped such that the position and direction of the second vehicle 10b with respect to the first vehicle 10a coincide with predetermined position and direction, the data of the position and direction of the second vehicle 10b with respect to the first vehicle 10a may be determined in advance. Also, the data of the position and, direction of the second vehicle 10b with respect to the first vehicle 10a may be acquired by various sensors, not illustrated, or the likes provided in the second vehicle 10b. The processing unit 24 outputs the data of the second portion 110b thus corrected to the projectors 16.

Based, on the corrected data of the second portion 110b of the three-dimensional image 100, the projectors 16 project the second portion 110b of the three-dimensional image 100 in the air outside the second vehicle 10b.

The third vehicle-mounted device 20c will now be described. The third vehicle-mounted device 20c operates similarly to the second vehicle-mounted device 20b. The communication unit 26 receives the data of the third portion 110c of the three-dimensional image 100 transmitted from the first vehicle-mounted device 20a.

Based on the data of the position and direction of the third vehicle 10c with respect to the first vehicle 10a, the processing unit 24 corrects: the data of the third portion 110c received at the communication unit 26 such that each of corresponding luminous points of the three-dimensional image 100 is projected on coordinates included in the data of the third portion 110c.

Based on the corrected data of the third portion. 110c of the three-dimensional image 100, the projectors 16 project the third portion 110c of the three-dimensional image 100 in the air outside the third vehicle 10c.

There will now be described the overall operation of the vehicles 10 and the vehicle-mounted devices 20 having the configurations set forth above. The vehicles 10 are stopped in an open space or the like and arranged in a predetermined manner. When data of a three-dimensional image is transmitted from a server device or the like to the first vehicle 10a, the projectors 16 of the vehicles 10 project the three-dimensional image 100. The viewers visually recognize the one three-dimensional image 100 formed by combining the first portion 110a, second portion 110b, and third portion 110c. The vehicles 10 can provide public viewing, for example.

Thus, according to the present embodiment, the projectors 16 of the first vehicle-mounted device 20a project the first portion 110a of the three-dimensional image 100, the projectors 16 of the second vehicle-mounted device 20b project the second portion 110b, and the projectors 16 of the third vehicle-mounted device 20c project the third portion 110c. Accordingly, with luminance similar to that of three-dimensional images projected, by the respective projectors 16, the three-dimensional image 100 larger in size than each of the three-dimensional images projected by the respective projectors 16 can be projected. Therefore, a larger and clearer three-dimensional image 100 can be easily projected outdoors.

Accordingly, when multiple vehicles 10 providing multiple services are gathered together, a visitor can easily recognize a vehicle 10 providing a desired service.

Third Embodiment

The third embodiment differs from the second embodiment in that the vehicle-mounted devices 20 of the vehicles 10 respectively project three-dimensional images 100 overlapping with one another. In the following, description will be given mainly for the differences from the second embodiment.

Since the configurations of the vehicle system 1, second vehicle-mounted device 20b, and third vehicle-mounted device 20c, and the arrangement of the vehicles 10 projecting the three-dimensional image 100 are identical with those in the second embodiment, and since the configuration of the first vehicle-mounted device 20a is identical with the configuration of the second vehicle-mounted device 20b in the second embodiment, the illustration thereof is omitted.

The communication unit 26 of each of the first vehicle-mounted device 20a, second vehicle-mounted device 20b, and third vehicle-mounted device 20c receives data of a three-dimensional image (hereinafter, referred to as first data) from a server device or the like.

In the first vehicle-mounted device 20a, based on the first data, the projectors 16 project a first three-dimensional image in the air outside the first vehicle 10a.

In the second vehicle-mounted device 20b, based on the information regarding the position and direction of the second vehicle 10b with respect to the first vehicle 10a, the processing unit 24 corrects the coordinates included in the first data received at the communication unit 26. The processing unit 24 outputs the data, thus corrected as second data to the projectors 16. Based on the second data, the projectors 16 project a second, three-dimensional image such that it overlaps with the first three-dimensional image. The second three-dimensional image is an image substantially identical with the first three-dimensional image.

In the third vehicle-mounted device 20c, based on the information regarding the position and direction of the third vehicle 10c with respect to the first vehicle 10a, the processing unit 24 corrects the coordinates included in the first data received at the communication unit 26. The processing unit 24 outputs the data thus corrected as third data to the projectors 16. Based on the third data, the projectors 16 project a third three-dimensional image such that it overlaps with the first three-dimensional image. The third three-dimensional image is an image substantially identical with the first three-dimensional image.

Since the first through third three-dimensional images overlap with one another, the viewers visually recognize one three-dimensional linage 100.

Thus, according to the present embodiment, the projectors 16 of the first vehicle-mounted device 20a project the first three-dimensional image, the projectors 16 of the second vehicle-mounted device 20b project the second three-dimensional image such that it overlaps with the first three-dimensional image, and the projectors 16 of the third vehicle-mounted device 20c project the third three-dimensional image such that it overlaps with the first three-dimensional image. Accordingly, the three-dimensional image 100 of which the luminance is higher than that of each of the first through third three-dimensional images can be projected. Therefore, a larger and clearer three-dimensional image 100 can be easily projected outdoors. Accordingly, when multiple vehicles 10 providing multiple services are gathered together, a visitor can easily recognize a vehicle 10 providing a desired service.

Although a difference in position among the portions of the three-dimensional image may be visually recognized in the second embodiment, occurrence of such a difference can be restrained in the present embodiment.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

For example, in the second embodiment, the multiple vehicle-mounted devices 20 may have the same configuration, and the vehicle system 1 may further comprise a server device. In this case, the server device has the function of the generating unit 30 of the first vehicle-mounted device 20a in the second embodiment and generates data of multiple portions of the three-dimensional image 100. The server device then transmits the data of each portion of the three-dimensional image 100 to the corresponding vehicle-mounted device 20. This modification allows greater flexibility in the configuration of the vehicle system 1.

In the second and third embodiments, the multiple vehicles 10 for projecting the three-dimensional image 100 may provide a service other than the image service, such as a food and drink service. Also in this modification, by a larger and clearer three-dimensional image 100 related to the service, a visitor can easily recognize a vehicle 10 providing a desired service.

Also, the vehicle-mounted device 20 may be provided with an illuminance sensor for detecting the illuminance above the vehicle 10. Accordingly, when the illuminance detected by the illuminance sensor is higher, the projectors 16 may project the three-dimensional image 100 with higher luminance. Therefore, it is possible to project the three-dimensional image 100 with higher luminance during daytime than during night-time, and visibility of the three-dimensional image 100 can be improved.

The projectors 16 may terminate the projection of the three-dimensional image 100 in response to a projection terminating operation provided by a user. Also, when it is found that the vehicle 10 is moving based on the speed information of the vehicle 10 or the like, the processing unit 24 may allow the projectors 16 to terminate the projection of the three-dimensional image 100 irrespective of whether or not the projection terminating operation is provided. In this modification, even if the user forgets to provide the projection terminating operation and starts the vehicle 10, the three-dimensional image 100 can be removed.

What is claimed is:

1. A vehicle-mounted device configured to be mounted on a vehicle for providing a service, the vehicle-mounted device comprising:
   a projector configured to project, on the basis of data of a three-dimensional image related to the service, the three-dimensional image in the air above the vehicle, the projector terminates a projection of the three-dimensional image in response to a projection terminating operation provided by a user; and
   a processing unit configured to allow the projector to terminate the projection of the three-dimensional image when the vehicle is moving, irrespective of whether or not the projection terminating operation is provided.

2. A vehicle system, comprising:
a first vehicle-mounted device configured to be mounted on a first vehicle; and
a second vehicle-mounted device configured to be mounted on a second vehicle, wherein: the first vehicle-mounted device comprises a first projector configured to project, on the basis of data of a first portion of a three-dimensional image, the first portion of the three-dimensional image in the air outside the first vehicle; and
the second vehicle-mounted device comprises a second projector configured to project, on the basis of data of a second portion of the three-dimensional image, the second portion of the three-dimensional image in the air outside the second vehicle.

3. A vehicle system, comprising:
a first vehicle-mounted device configured to be mounted on a first vehicle; and
a second vehicle-mounted device configured to be mounted on a second vehicle, wherein: the first vehicle-mounted device comprises a first projector configured to project, on the basis of first data, a first three-dimensional image in the air outside the first vehicle; and
the second vehicle-mounted device comprises a second projector configured to project, on the basis of second data, a second three-dimensional image such that the second three-dimensional image overlaps with the first three-dimensional image.

4. The vehicle-mounted device of claim 1, wherein when an illuminance above the vehicle detected by an illuminance sensor is higher, the projector projects the three-dimensional image with luminance higher compared to the illuminance when the illuminance above the vehicle detected by the illuminance sensor is lower.

* * * * *

UNITED STATES PATENT AND TRADEMARK OFFICE
CERTIFICATE OF CORRECTION

PATENT NO. : 10,838,227 B2
APPLICATION NO. : 16/229558
DATED : November 17, 2020
INVENTOR(S) : Tomohito Matsuoka et al.

It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

Item (72), inventor 2, city, delete "Nisshin" and insert --Nisshin-shi Aichi-ken--, therefor.

Item (72), inventor 3, city, delete "Seto" and insert --Seto-shi Aichi-ken--, therefor.

Item (72), inventor 4, city, delete "Chofu" and insert --Chofu-shi Tokyo-to--, therefor.

Item (72), inventor 5, city, delete "Okazaki" and insert --Okazaki-shi Aichi-ken--, therefor.

Item (72), inventor 6, city, delete "Toyota" and insert --Toyota-shi Aichi-ken--, therefor.

Item (73), assignee, city, delete "Toyota" and insert --Toyota-shi Aichi-ken--, therefor.

In the Specification

In Column 1, Line(s) 30, after "system", delete ",".

In Column 2, Line(s) 6, after "configured", delete ":".

In Column 3, Line(s) 57, after "perform", delete ":".

In Column 5, Line(s) 18, after "100", delete "," and insert --.--, therefor.

In Column 5, Line(s) 22, after "three-dimensional", delete ",".

In Column 5, Line(s) 54, delete "80" and insert --30--, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,838,227 B2

In Column 5, Line(s) 66, after "vehicle-mounted", delete ",".

In Column 6, Line(s) 19, after "and", delete ",".

In Column 6, Line(s) 37, after "corrects", delete ":".

In Column 6, Line(s) 65, after "projected", delete ",".

In Column 7, Line(s) 37, after "data", delete ",".

In Column 7, Line(s) 39, after "second", delete ",".